United States Patent [19]
Bratkowski et al.

[11] 3,963,948
[45] June 15, 1976

[54] MAGNETIC PULSE GENERATOR

[75] Inventors: Walter V. Bratkowski, McKeesport; John A. Wafer, Monroeville, both of Pa.

[73] Assignee: Westinghouse Electric Corporation, Pittsburgh, Pa.

[22] Filed: Feb. 25, 1975

[21] Appl. No.: 552,833

[52] U.S. Cl. .................................. 310/15; 310/30
[51] Int. Cl.² .................................... H02K 35/06
[58] Field of Search .......................... 310/12–15, 310/30, 4, 4 A

[56] References Cited
UNITED STATES PATENTS

| | | | |
|---|---|---|---|
| 2,121,259 | 6/1938 | Parsons | 310/4 A |
| 3,024,374 | 3/1962 | Stauder | 310/18 |
| 3,116,428 | 12/1963 | Blodgett et al. | 310/15 |
| 3,130,332 | 4/1964 | Zehfeld et al. | 310/15 |
| 3,153,735 | 10/1964 | Branagan et al. | 310/15 |
| 3,202,886 | 8/1965 | Kramer | 310/14 X |
| 3,259,769 | 7/1966 | Stott | 310/14 |
| 3,351,850 | 11/1967 | Crawford et al. | 310/15 X |
| 3,718,828 | 2/1973 | Britton et al. | 310/15 |
| 3,774,058 | 11/1973 | Abel | 310/15 |

*Primary Examiner*—Donovan F. Duggan
*Attorney, Agent, or Firm*—M. P. Lynch

[57] ABSTRACT

A tubular soft iron member is slidably positioned within a magnet-coil assembly and adapted to respond to toggle action travel between two magnetically stable states by producing rapid changes in magnetic flux. Electrical pulses developed by the coil in response to the changes in magnetic flux are useful for control and alarm purposes.

4 Claims, 4 Drawing Figures

MAGNETIC PULSE GENERATOR

BACKGROUND OF THE INVENTION

There is described in detail in U.S. Pat. No. 3,772,669 issued Nov. 13, 1973, and titled MAGNETIC PULSE GENERATOR a spring actuated magnetic pulse generator suitable for numerous applications including that of a security monitoring device. A specific embodiment illustrates a magnet assembly and a soft iron member slidably positioned within a housing and responding to biasing of spring members to make and break a magnetic circuit thereby generating an electrical pulse proportional to the change in magnetic flux. In the embodiment illustrated the movable magnet assembly, the soft iron member and the spring bias means are enclosed within a tubular housing thus requiring close mechanical tolerances in order to maintain free movement of the components as well as actuate alignment of the magnet assembly and soft iron member. The implementation of the specific embodiment illustrated in the above identified issued patent is relatively expensive due to the tolerance requirements for the cooperating components.

SUMMARY OF THE INVENTION

The invention disclosed herein in reference to the accompanying drawing is a specific configuration of a magnetic pulse generator whereby the critical alignment and tolerance requirements of prior art devices are avoided and a relatively inexpensive and simple mechanical arrangement of components is provided to produce a magnetic pulse generator suitable for numerous applications including security.

In the disclosed embodiment, a magnet and electrical coil assembly are positioned within a housing having an aperture therein to accommodate slidable movement of a tubular soft iron armature extending through a wall of the housing and into a passage between the pole pieces of the magnet.

An actuator is coupled to the end of the armature outside of the housing through spring members coaxially disposed about the tubular soft iron armature. The spring members respond to the presence or absence of forces applied to the actuator by positioning the armature in one of two magnetically stable positions within the housing. In the absence of a force being applied to the actuator, the armature contacts one end wall of the housing, with the housing functioning to complete a magnetic circuit through the magnet and across an air gap between the pole pieces of the magnet and the soft iron armature. Thus a first magnetically stable or latched condition is established. When external forces are applied to the actuator sufficient to establish a spring force exceeding the magnetic latching force, the armature is snapped in a toggle action from the first magnetically stable condition to a second magnetically stable condition wherein the armature contacts the opposite end wall of the housing. Once again a magnetic circuit is completed through the housing and across the air gap between the pole pieces of the magnet and the armature. This second magnetically stable condition remains until the external force is removed from the actuator and the spring members cause the armature to assume the first magnetically stable position.

The electrical coil responds to the rapid changes in magnetic flux produced by the toggle action of the armature between the two magnetically stable positions by generating electrical pulses. The presence of an external applied force produces an electrical pulse of one polarity while the absence of an external force produces electrical pulse of opposite polarity.

In a security application of the bi-stable magnetic pulse generator, a pulse of one polarity can be used as an arming signal while the opposite polarity pulse can be used for alarm purposes.

DESCRIPTION OF THE DRAWINGS

The invention will become more readily apparent from the following exemplary description in connection with the accompanying drawings.

DESCRIPTION OF THE PREFERRED EMBODIMENT

Figure 1:
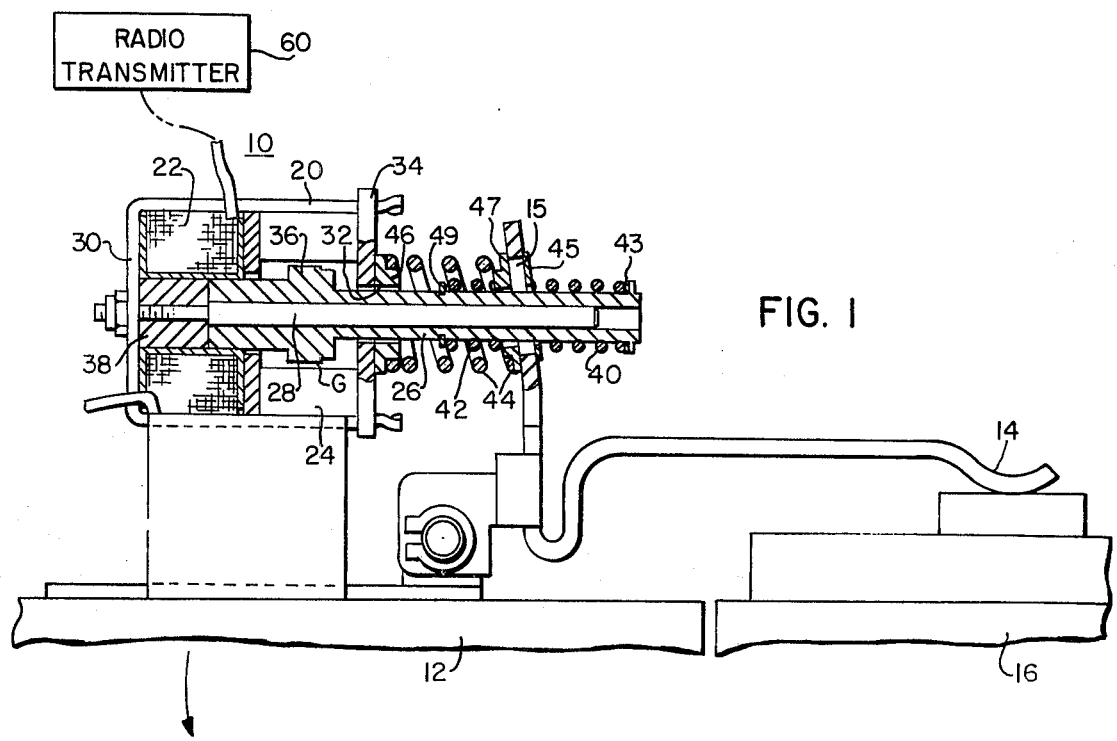
FIG. 1 is an illustration of a typical embodiment of the invention in a closed condition.

Referring to FIG. 1 there is illustrated a sectioned view of a magnetic pulse generator 10 secured to a door 12 and having a lever arm actuating mechanism 14 contacting the door jam 16 and responding to the movement of door jam 16, as illustrated by the arrows, to transmit the open or closed condition of the door 12 to the magnetic pulse generator 10.

The magnetic pulse generator 10 basically includes a housing 20, an electrical coil 22 and a magnet assembly 24 secured within the housing 20 and having a passage therethrough to accommodate a tubular soft magnetic armature 26 which is slidably positioned on a non-magnetic alignment pin 28 which is mechanically secured to the end wall 30 of the housing 20. The armature 26 and the alignment pin 28 extend through an aperature 32 in the opposite end wall 34 of the housing 20. The outward movement of the soft magnetic armature 26 is limited in part by the annular shoulder 36 contacting the inner surface end wall 34 while the inward movement of the soft magnetic armature 26 is limited by the end stop 38. The inward and outward movement of the soft magnetic armature 26 in response to the rotational movement of the lever arm 14 is a function of the coil spring members 40, 42 and 44 through which the armature 26 extends. The lever arm 14 is not in direct mechanical connection with the soft magnetic armature 26 but rather is indirectly coupled to the soft magnetic armature 26 through the spring members 40 and 42 and their respective spring retainers 43 and 45, and 47 and 49. The large outer spring 44 extends from a spring retainer 46 to direct contact with the lever arm 14 and is of a diameter greater than the aperture 15 in the lever arm 14 through which the soft magnetic armature 26 freely passes.

In the embodiment illustrated in FIG. 1, with the door 12 closed and the lever arm rotated in a counterclockwise direction to the position indicated. This movement of the lever arm 14 causes spring members 42 and 44 to be compressed while releasing the upper spring member 40 from a compressive state. As initially mounted, the spring members 40 and 42 are mounted in compression against the respective retaining rings which are mechanically secured to the soft magnetic armature 26 as illustrated. The compression of the spring 42 caused by the counterclockwise rotational movement of the lever arm 14 forces the soft magnetic armature 26 into contact with the end stop 38. The compression of the spring members 42 and 44 continues until the lever arm assumes the closed position illustrated in the embodiment of FIG. 1. The energy stored up in the compression of the outer spring 44 is subsequently used to produce positive rapid clockwise rotation of the lever arm 14 when the door 12 is open. The spring force thus developed by spring member 44 will cause immediate compression of the spring member 40 which in turn will act against the spring retainer 43 to produce rapid outward movement of the soft magnetic armature 26 from its magnetically latching contacting relationship with the end stop 38. The design selection of spring 44 determines the amount of travel of the armature 26 which will be required to cause toggle action of the armature. In the application of the bi-stable magnetic pulse generates as a security device as illustrated in FIG. 1, the spring 44 would be designed to cause toggle action before the door is completely open.

Figure 2:
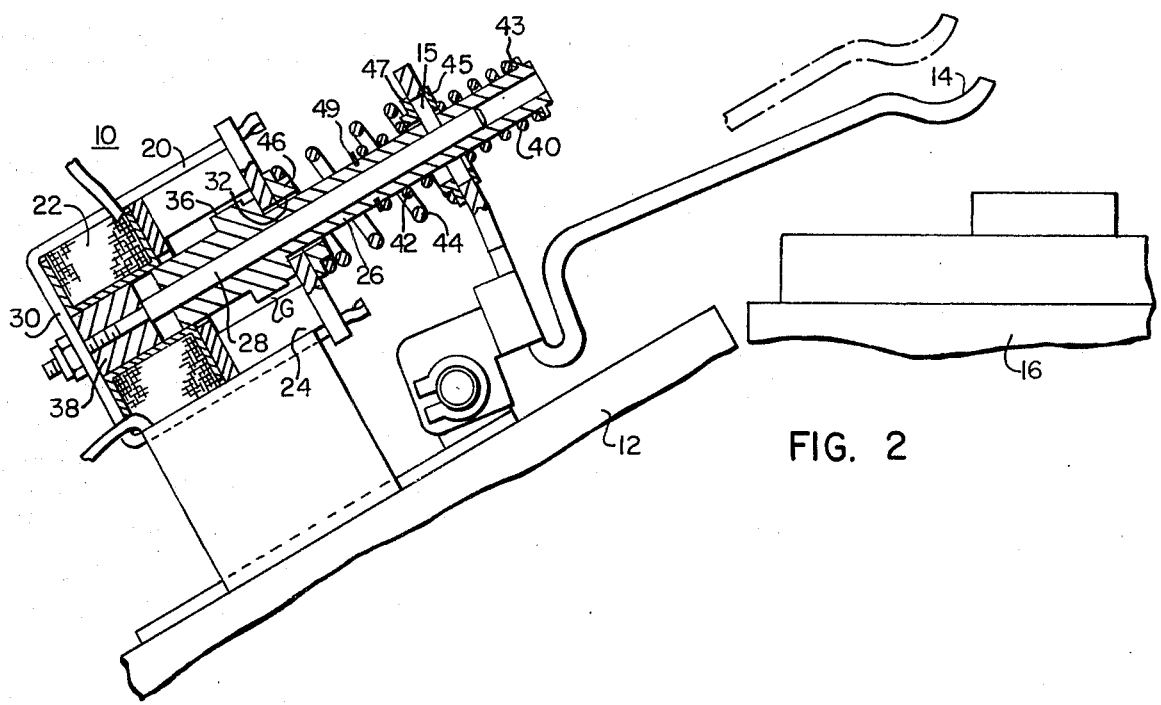
FIG. 2 is an illustration of an embodiment of FIG. 1 in an open condition.

This brief description of the operation of the magnetic pulse generator 10 identifies a bi-stable design, that is, a design in which a magnetic pulse generator has two stable positions where the soft magnetic armature 26 is held in equilibrium, i.e., the closed condition as illustrated in FIG. 1 or the open condition illustrated in FIG. 2. The rapid movement of the soft magnetic armature 26 between the two states of equilibrium causes a rapid change in magnetic flux within the magnetic pulse generator 20 which results in the development of an electrical signal by an electrical coil 22.

The magnetic circuit established in the closed condition of FIG. 1 is illustrated by the arrows. The magnetic flux path extends from the pole pieces of the magnet assembly 24 across an air gap G through the soft magnetic armature 26, the end stop 38 and the walls of the housing 20 back to the magnet assembly 24. The radial flux path between the pole pieces of the magnet assembly 24 and the soft armature 26 across the air gap G eliminates the critical alignment requirements of the armature and magnetic pole pieces of the magnetic pulse generator illustrated in the above referenced U.S. patent. The design illustrated in FIG. 1 eliminates the need for close mechanical tolerances between the components of the magnetic pulse generator 10 thus permitting inexpensive mass production of the pulse generator 10. In the closed position illustrated in FIG. 1 the soft magnetic armature 26 can be considered to be in a magnetically latched relationship with the magnet assembly 24.

The design of the spring member 44 is such that the compressive force exerted against the lever arm 14 upon opening of the door 12 is greater than the magnetic coupling force between the soft magnetic armature 26 and the magnet assembly 24 thus causing unlatching and rapid outward movement of the soft magnetic armature 26 thereby producing a rapid collapse in the magnetic flux circuit defined by the arrows. This rapid change in magnetic flux results in the generation of an electrical output pulse from the electrical coil 22 which, if applied to a radio transmitter 60, can be translated into a signal capable of generating an alarm indication in the event the magnetic pulse generator is incorporated in a security application.

In the open condition, as illustrated in FIG. 2, a new magnetic circuit and flux path is established as illustrated by the arrows. The completion of the second magnetic circuit as illustrated in FIG. 2 results in the development of a second voltage pulse due to a rapid increase in magnetic flux as a result of a movement of the soft magnetic armature from the closed to the open condition. This second voltage pulse is of opposite polarity to the pulse developed as a result of the collapse of the magnetic field established in the closed condition. The fact that the pulses are of opposite polarity permits discrimination between signals generated as a result of arming the magnetic pulse generator and signals developed as a result of an alarm or monitored condition.

Figure 3:
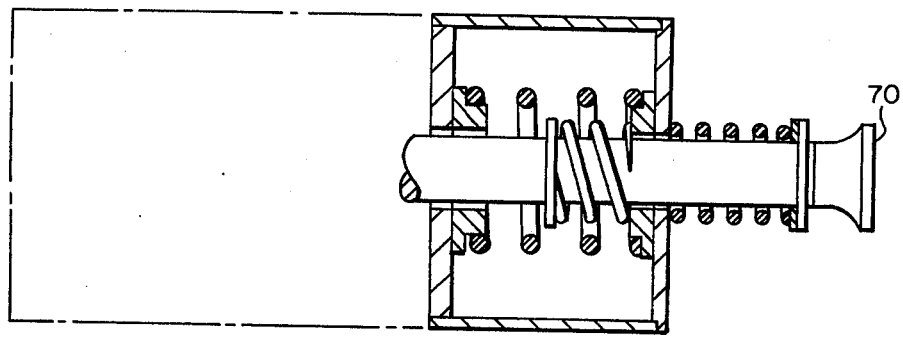
FIG. 3 is a partial illustration of an alternate actuating mechanism for use in the embodiments of FIGS. 1 and 2.

In the embodiment illustrated in FIG. 3, the rotating lever arm 14 of FIG. 1 is replaced by a button 70 which provides for a compact magnet pulse generator suitable for use as a personal security alarm device whereby an individual can actuate the magnetic pulse generator by merely depressing the button 70 to develop a signal capable of being transmitted to a remote receiving station.

Figure 4:
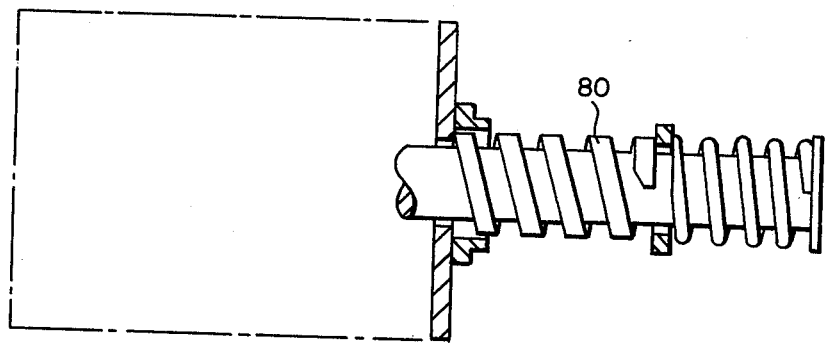
FIG. 4 is an illustration of an application of the embodiment of FIG. 1 as a temperature sensor.

Yet another potential application for the simple magnetic pulse generator design of FIG. 1 is illustrated in FIG. 4. In this embodiment the lever arm 14 of FIG. 1 is replaced by a temperature sensor which translates temperature variations into mechanical movement. Typically such a device could be a bimetal spring member 80 which, if coupled to the magnetic armature 26 as illustrated would provide a temperature actuating magnetic pulse generator suitable for use as a fire sensor.

What we claim is:

1. A bi-stable magnetic pulse generator assembly, comprising an elongated armature adapted for lineal movement along the longitudinal axis, a single magnet assembly having pole pieces positioned in a radial relationship with respect to said armature to establish an air gap therebetween and provide a passage therebetween to support the lineal movement of said armature, electrical coil means operatively associated with said magnet assembly, magnetic circuit means for magnetically latching said armature through said single magnet assembly in both a first and second stable position, and actuator means coupled to said armature to respond to an actuating force which is applied in a direction opposing the magnetic force latching said armature in either said first or second stable position to rapidly move said armature to said other stable position when the actuating force exceeds said magnetic force independent of the rate at which the actuating force is applied, said magnetic circuit means providing a first and second magnetic circuit through said single magnet assembly, said first magnetic circuit corresponding to the magnetic flux path established between said armature and said single magnet assembly when said armature is in said first stable position, and said second magnetic circuit corresponding to the magnetic flux path between said armature and said single magnet assembly when said armature is in said second stable position, said single magnet assembly producing a magnetic flux transfer from said first magnetic circuit to said second magnetic circuit in response to movement of said armature from said first stable position to said second stable position and producing a magnetic flux transfer from said second magnetic circuit to said first magnetic circuit in response to movement of said armature from said second stable position to said first stable position, said magnetic flux transfer enhancing the movement of said armature from said one stable position to the other stable position, said electrical coil means responding to the changes in magnetic flux caused by the movement of said armature between said first and second stable positions by producing electrical pulses.

2. A bi-stable magnetic pulse generator assembly as claimed in claim 1, wherein said magnetic circuit means includes a housing enclosing said single magnet assembly and said electrical coil means, said housing functioning to complete said first and second magnetic circuits through said armature and said single magnet assembly.

3. A bi-stable magnetic pulse generator as claimed in claim 2, wherein said electrical coil means develops a pulse of a first polarity in response to the collapse of the magnetic flux field produced by movement of said armature from one of said stable positions and an electrical pulse of opposite polarity in response to the build up of a magnetic flux field produced by movement of said armature to one of said stable positions.

4. A bi-stable magnetic pulse generator assembly as claimed in claim 1, wherein said actuator means includes an actuator member and spring bias means coupling said actuator member to said armature, said spring bias means functioning to store the energy corresponding to the actuating force applied to said actuator member until said force exceeds the magnetic force latching said armature in either said first or second stable position at which time said spring bias means overcomes said magnetic force to rapidly move said armature to the other of said stable positions.

* * * * *